Oct. 16, 1945.  C. A. SAWTELLE  2,386,913
WEAR COMPENSATOR FOR BRAKES
Filed May 4, 1944
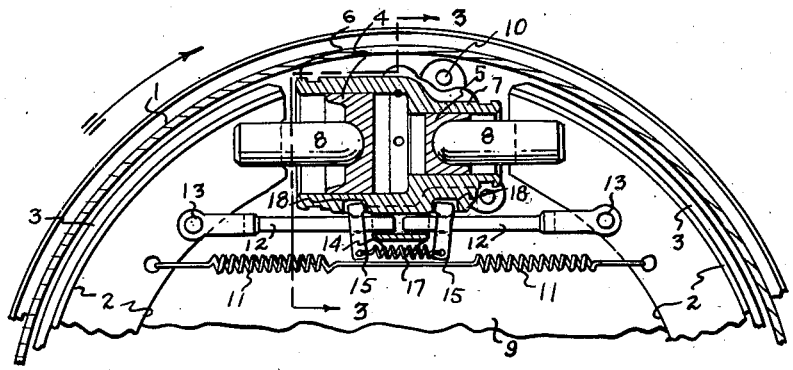
Fig. 1
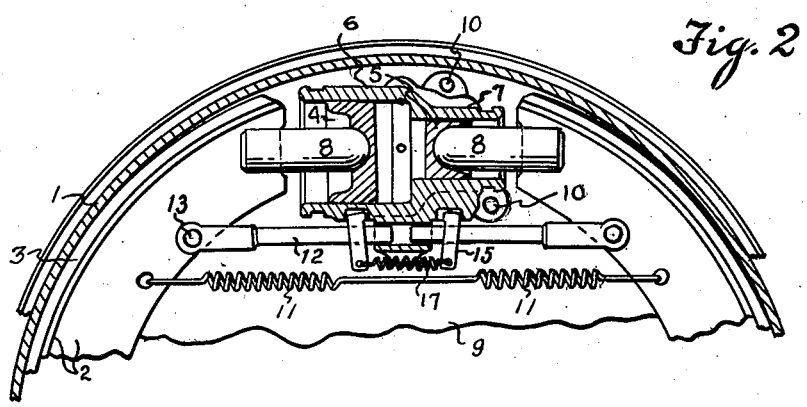
Fig. 2
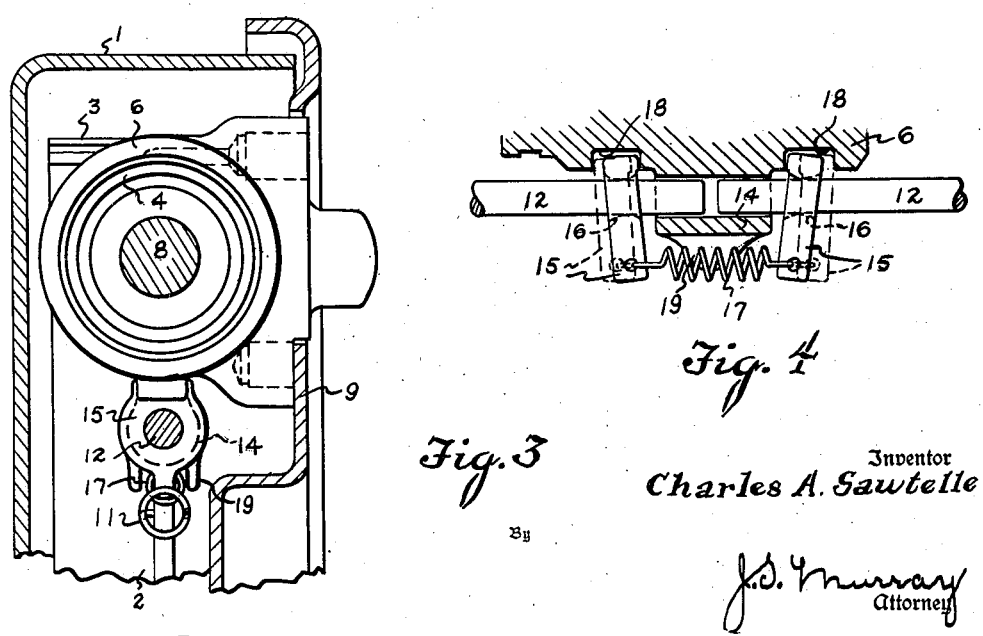
Fig. 3
Fig. 4
Inventor
Charles A. Sawtelle
J. S. Murray
Attorney Patented Oct. 16, 1945

2,386,913

UNITED STATES PATENT OFFICE 2,386,913

WEAR COMPENSATOR FOR BRAKES

Charles A. Sawtelle, Rosedale Gardens, Mich.

Application May 4, 1944, Serial No. 534,107

9 Claims. (Cl. 188—79.5)

This invention relates to wear compensators for brakes and particularly compensators of an automatic nature.

It is common knowledge that brake shoes and particularly vehicle brake shoes require adjustment from time to time in compensation for wear of their friction linings, and various mechanisms have been designed for automatically effecting such adjustment. The object of the invention is to provide an automatic compensator of simpler, less expensive, and more reliable construction than has heretofore been designed.

This and various other objects are attained by the construction hereinafter described and illustrated in the accompanying drawing, wherein:

Fig. 1 is a fragmentary sectional view of a vehicle brake, showing the brake shoes released.

Fig. 2 is a similar view, showing the shoes applied.

Fig. 3 is a cross sectional view of said brake taken on the line 3—3 of Fig. 1.

Fig. 4 is an enlargement of a portion of Fig. 1, particularly showing the action of certain detents.

In these views, the reference character 1 designates a brake drum interiorly engageable by shoes 2 equipped with the usual friction linings 3. Said shoes have spaced ends between which is installed a provision for spreading the shoes apart into operative engagement with the drum. The illustrated provision comprises pistons 4 and 5 operating respectively in cylinders 6 and 7 and taking effect on the shoes through thrust pins 8, such an arrangement being well known. It is also well known to differentially proportion the pistons and their cylinders, as shown, to compensate for the wrapping effect which in the normal direction of rotation (shown by the arrow) tends to apply the leading shoe more strongly than the other. It is preferred to employ a single cylinder block for both cylinders, and to suitably secure such block to the backing plate 9, as by rivets 10. A coiled spring 11 interconnects the shoes to normally withdraw them from the drum.

Describing now my improved compensator, 12 designates a pair of cylindrical struts, substantially aligned and pivoted at their relatively remote ends to the shoes as indicated at 13. The mutually adjacent ends of said struts are slidably supported in a lug 14 projecting toward the axis of the brake from the cylinder block, and said struts take effect on the cylinder block through a pair of detents 15 to limit retractive response of the shoes to the spring 11. The detents are respectively mounted on the respective struts, one at each side of the lug 14, being formed with apertures 16 wherein the struts are slidingly fitted, the walls of such apertures being convexly rounded to afford the detents a limited rocking movement. It is preferred to elongate the detents substantially toward the brake axis, their inner ends being interconnected by a coiled spring 17 disposed radially inward of the lug 14, the detents being thus rocked toward each other at their inner ends and normally locked in rigid engagement with the struts. The outer ends of the detents engage loosely in notches 18 similarly transversely formed in the cylinder block. A pair of inward projections 19 on the lug 14 engage at opposite sides of the spring 17 to restrain the detents from shifting rotatively on the struts.

In operation of the compensator, the detents engage the relatively adjacent walls of the notches 18 to establish a normal released position of the shoes, the thrust applied to the detents in so functioning adding to the effect of the spring 17 in locking the detents fixedly on the struts. When the shoes are applied, the detents travel with the struts as the latter are separatively actuated by the shoes, the spring 17 being increasingly tensioned. The width of the notches affords a free travel of the detents corresponding to the intended outward travel of the shoes. When wear of the linings renders brake-applying travel of the shoes slightly excessive, the detents encounter the relatively remote walls of the notches 18. The spring 17 is thus sufficiently overcome to relieve the locking reaction between the detents and struts, and the former slide on the latter to the extent of excessive strut travel. Thus, when the brake is released, the detents in their new positions permit only a proper retraction of the shoes, and clearance between the shoes and drum is never permitted to become materially excessive.

While the advantages of such automatic regulation have long been appreciated, it is believed the mechanism described is superior in simplicity and reliability to any heretofore designed for a like purpose.

It will be appreciated that the improved compensator is by no means limited to association with the illustrated hydraulic shoe actuator or any particular actuator.

What I claim is:

1. In an automatic compensator for wear, the combination with a rotatable friction-receiving brake member, a friction-applying member movable to engage and disengage said rotatable member, and means yieldably urging the friction-applying member to a disengaged position, of a strut for limiting disengaging travel of the friction-applying member, a connection through which the strut takes effect on and is movable in unison with the friction-applying member, a detent slidingly fitted on and fully carried by the strut and rockable in a plane substantially axial to the strut to lock such detent on the strut, means maintaining the detent normally yieldably locked on the strut to travel bodily with the strut, a stop at one side of and engageable by the detent to limit disengaging travel of the friction-applying member, a second stop at the other side of and engageable by the detent in its travel incident to an application of friction and effective to rock the detent to an unlocked position, whereby the detent may slide in compensation for wear of the brake, and means restraining the detent from material rotation about the strut axis.

2. In an automatic compensator as set forth in claim 1, means for guiding the strut in a substantially rectilinear travel, the connection of the strut to the friction-applying member being pivotal.

3. In an automatic compensator for wear, the combination with a rotatable, friction-receiving brake member, a pair of friction-applying members movable to and from each other to disengage and engage said rotatable member, and means yieldably urging the friction-applying members to a disengaged position, of struts for limiting disengaging travel of the friction-applying members, connections through which the struts take effect on and are movable by the friction-applying members, detents slidingly fitted on and fully carried by the struts and rockable to lock them on the struts, a resilient connection between the detents rocking them normally to a locked position on the struts, stops between the detents engageable by the detents and limiting their travel with the struts toward each other and thereby limiting disengaging travel of the friction-applying members, and stops between the detents and friction-applying members engageable by the detents in their travel from each other with the struts and effective to rock the detents to unlocked positions, whereby the detents may slide on the struts in compensation for wear.

4. In an automatic compensator for wear, the combination with a pair of friction-applying members movable from each other to apply friction, a pair of struts respectively secured to the respective friction-applying members and projecting substantially toward each other, elements fully carried by the struts for limiting retraction of the friction-applying members, stops fixed relative to the friction-applying members and struts engageable by said elements responsive to friction-applying travel of said members for shifting the elements bodily on the struts in compensation for wear, and a yieldable connection between said elements, normally fixing them on the struts, and facilitating their displacement by said stops.

5. In an automatic compensator for wear, the combination with a rotatable friction-receiving brake member, a friction-applying member movable to engage and disengage said rotatable member, and means yieldably urging the friction-applying member to a disengaged position, of a strut for limiting disengaging travel of the friction-applying member, a connection through which the strut takes effect on and is movable in unison with the friction-applying member, a detent slidingly fitted on and fully carried by the strut and rockable in a plane substantially axial to the strut to lock such detent on the strut, means maintaining the detent normally yieldably locked on the strut to travel bodily with the strut, a stop at one side of and engageable by the detent to limit disengaging travel of the friction-applying member, a second stop at the other side of and engageable by the detent in its travel incident to an application of friction and effective to rock the detent to an unlocked position, whereby the detent may slide in compensation for wear of the brake, means restraining the detent from material rotation about the strut axis, fluid pressure means for applying the brake including a piston and cylinder, both of said stops being carried by the cylinder.

6. In an automatic compensator for wear, the combination with a rotatable friction-receiving brake member, a friction-applying member movable to engage and disengage said rotatable member, and means yieldably urging the friction-applying member to a disengaged position, of a strut for limiting disengaging travel of the friction-applying member, a connection through which the strut takes effect on and is movable in unison with the friction-applying member, a detent slidingly fitted on and fully carried by the strut and rockable in a plane substantially axial to the strut to lock such detent on the strut, means maintaining the detent normally yieldably locked on the strut to travel bodily with the strut, a stop at one side of and engageable by the detent to limit disengaging travel of the friction-applying member, a second stop at the other side of and engageable by the detent in its travel incident to an application of friction and effective to rock the detent to an unlocked position, whereby the detent may slide in compensation for wear of the brake, means restraining the detent from material rotation about the strut axis, and a slide guide for the strut, both of said stops being carried by the guide.

7. In an automatic compensator for wear, the combination with a rotatable, friction-receiving brake member, a pair of friction-applying members movable to and from each other to disengage and engage said rotatable member, and means yieldably urging the friction-applying members to a disengaged position, of struts for limiting disengaging travel of the friction-applying members, said struts having adjacent end portions, a slide guide for both of said end portions, connections through which the struts take effect on and are movable by the friction-applying members, detents slidingly fitted on and fully carried by the struts and rockable to lock them on the struts, a resilient connection between the detents rocking them normally to a locked position on the struts, stops between the detents engageable by the detents and limiting their travel with the struts toward each other and thereby limiting disengaging travel of the friction-applying members, and stops between the detents and friction-applying members engageable by the detents in their travel from each other with the struts and effective to rock the detents to unlocked positions, whereby the detents may slide on the struts in compensation for wear.

8. In an automatic compensator for wear, the combination with a rotatable, friction-receiving brake member, a pair of friction-applying members movable to and from each other to disengage and engage said rotatable member, and means yieldably urging the friction-applying members to a disengaged position, of struts for limiting disengaging travel of the friction-applying members, said struts having adjacent end portions, a slide guide for said end portions positioned between said detents, connections through which the struts take effect on and are movable by the friction-applying members, detents slidingly fitted on and fully carried by the struts and rockable to lock them on the struts, a resilient connection between the detents rocking them normally to a locked position on the struts, stops between the detents engageable by the detents and limiting their travel with the struts toward each other and thereby limiting disengaging travel of the friction-applying members, and stops between the detents and friction-applying members engageable by the detents in their travel from each other with the struts and effective to rock the detents to unlocked positions, whereby the detents may slide on the struts in compensation for wear.

9. In an automatic compensator for wear, the combination with a rotatable, friction-receiving brake member, a pair of friction-applying members movable to and from each other to disengage and engage said rotatable member, and means yieldably urging the friction-applying members to a disengaged position, of struts for limiting disengaging travel of the friction-applying members, connections through which the struts take effect on and are movable by the friction-applying members, detents slidably fitted on the struts and rockable to lock them on the struts, a resilient connection between corresponding ends of said detents rocking them normally to a locked position on the struts, and stops associated with the other end of each detent, two of such stops limiting travel of the detents and the struts toward each other and thereby limiting disengaging travel of the friction-applying members, and two of said stops being engageable by the detents in travel of the struts from each other, and being effective to rock the detents to unlocked positions whereby the detents may slide on the struts in compensation for wear.

CHARLES A. SAWTELLE.